United States Patent
Cha et al.

(10) Patent No.: US 7,904,059 B2
(45) Date of Patent: Mar. 8, 2011

(54) METHOD AND MOBILE TERMINAL FOR IMPLEMENTING VECTOR ANIMATION INTERACTIVE SERVICE ON MOBILE PHONE BROWSER

(75) Inventors: Bongjun Cha, Incheon (KR); Hoojong Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 1079 days.

(21) Appl. No.: 10/590,653

(22) PCT Filed: Feb. 25, 2005

(86) PCT No.: PCT/KR2005/000528
§ 371 (c)(1),
(2), (4) Date: Jan. 24, 2007

(87) PCT Pub. No.: WO2005/094098
PCT Pub. Date: Oct. 6, 2005

(65) Prior Publication Data
US 2007/0174415 A1    Jul. 26, 2007

(30) Foreign Application Priority Data

Feb. 25, 2004  (KR) .................. 10-2004-0012817
Jul. 20, 2004  (KR) .................. 10-2004-0056406

(51) Int. Cl.
*H04M 3/42* (2006.01)
(52) U.S. Cl. .................. 455/414.1; 709/219; 709/226; 709/246; 345/473; 345/474
(58) Field of Classification Search ........ 455/412.1–417
See application file for complete search history.

(56) References Cited

U.S. PATENT DOCUMENTS 6,993,476 B1 *  1/2006  Dutta et al. .................. 704/9
2002/0173294 A1 * 11/2002  Nemeth et al. .................. 455/412

* cited by examiner

*Primary Examiner* — Dai A Phuong
(74) *Attorney, Agent, or Firm* — Lowe Hauptman Ham & Berner LLP

(57) ABSTRACT

Disclosed is a method for implementing a vector animation interactive service on a mobile communication terminal browser. The method includes the steps of: a) requesting a supply of a WAP page through a wireless Internet; b) downloading a WML script constituting the WAP page; c) transferring the WML script to an embedded plug-in, and processing a portion, which includes information for an image and a dynamic image or execution information for a game in the WML script, at a variable value for conversion in the embedded plug-in; d) transferring the information processed at the variable value to a vector graphic engine; and e) displaying or executing the image, the dynamic image or the game through the vector graphic engine. According to the method, it is possible to provide users with various multimedia services such as interactive menus, games, advertisements and content reproduction even in a state where a browser is not closed, so that browser capacity can be minimized and a resource such as a memory of the mobile communication terminal can be saved. Consequently, it is possible to promote interest of the user for use of a wireless Internet.

14 Claims, 4 Drawing Sheets

4 A

4 B

4 C

4 D

METHOD AND MOBILE TERMINAL FOR IMPLEMENTING VECTOR ANIMATION INTERACTIVE SERVICE ON MOBILE PHONE BROWSER

CROSS REFERENCE TO RELATED APPLICATION

This application is the National Phase application of International Application No. PCT/KR2004/000528, Feb. 25, 2005, which designates the United States and was published in English. This application, in its entirety, is incorporated herein by reference.

TECHNICAL FIELD

The present invention relates to a method for implementing a vector animation interactive service on a mobile communication terminal browser. More particularly, the present invention relates to a method for implementing a vector animation interactive service, which converts a text-based browser expression scheme to a browser expression scheme based on various multimedia graphics by interlocking a plug-in technology of a mobile communication terminal browser with a vector animation technology.

BACKGROUND ART

Recently, mobile communication terminals, such as cellular phones, Personal Communication Service (PCS) terminals, Personal Digital Assistant (PDA) terminals, smart phones, handsets, web TVs, are being well utilized when users connect to a wireless Internet through the mobile communication terminals, and receives text or image type information. Further, a commercialized Code Division Multiplex Access (CDMA)-2000 network or International Mobile Telecommunications (IMT)-2000 network is used in a wireless Internet service, so that multimedia information such as a dynamic image has been provided to users in addition to text or image type information.

Currently, most data services from mobile communication carriers and Contents Providers (CPs) have been provided through a wireless Internet based on a Wireless Application Protocol (WAP). Further, since mobile communication terminals target voice-centered communication and have small displays, only a small quantity of information can be displayed on the display. Further, since the mobile communication terminals have small keypads or touch screens as a sole input means, it is inconvenient to use the small keypads or touch screens. Accordingly, an information retrieval of the wireless Internet has depended on a directory-based menu scheme.

In particular, when a CP constructs a directory-based hierarchical menu in consideration of the small display and keypad of the mobile communication terminal, the CP lessens the number of selection items included in each menu and allows a desired webpage to be displayed through several steps.

FIG. 1 is a screen of a mobile communication terminal showing the course of using a wireless Internet by means of a conventional WAP browser.

A user connects to the wireless Internet through an Internet access menu, such as a 'NATE' of SK telecom, a 'Magic-N' of KTF and an 'Ez-i' of LG telecom, of the mobile communication terminal. When a first menu screen including texts appears as shown in FIG. 1a, the user selects a directory including desired contents by means of a keypad of the mobile communication terminal. When the user selects the desired sub-directory in the first menu screen, a menu screen included in the selected directory appears as shown in FIG. 1b. For example, when the user selects the '4. music/picture/movie' in the first menu screen of FIG. 1a, the second menu screen appears as shown in FIG. 1b. Then, when the user selects '1. downloading ringing sound' in the second menu screen, the sub-menu screen appears as shown in FIG. 1c. Further, when the user selects the sub-directory in the sub-menu screen of FIG. 1c, another sub-menu screen appears. If said another sub-menu screen is the last menu screen, contents such as a text, a picture and a dynamic image are displayed. When the user selects the contents, the corresponding contents are executed in the mobile communication terminal.

Since the WAP browser being currently used as described above displays the menu screen including only the text, the WAP browser performs only a simple information transfer function. Recently, two-dimensional images have been used to provide a visual effect, but several stationary two-dimensional images are arranged in icons on a menu and displayed through limited animations constituting a screen. Therefore, it is difficult to allow a user to clearly understand a selected menu.

Further, when specific contents are downloaded for downloading and reproducing of the corresponding contents in an existing mobile communication terminal, the contents are reproduced only after the WAP browser is closed. Herein, when there is no plug-in for reproducing the corresponding contents, the mobile communication terminal user must download the plug-in through the wireless Internet, another wire apparatus or a wire network, and install the plug-in in the mobile communication terminal. Further, it is inconvenient to the user in that the WAP browser must be closed in order to reproduce the downloaded contents by means of the downloaded plug-in. Accordingly, it is required to develop a technology capable of reproducing the contents in a state where the WAP browser is not closed.

DISCLOSURE OF THE INVENTION

Therefore, the present invention has been made in view of the above-mentioned problems, and it is an object of the present invention to provide a method for implementing a vector animation interactive service, which converts a text-based browser expression scheme to a browser expression scheme based on various multimedia graphics by interlocking a plug-in technology of a mobile communication terminal browser with a vector animation technology.

According to one aspect of the present invention, there is provided a vector animation interactive service method for implementing an interactive function of a vector animation by interlocking a plug-in technology used in a browser executed in a mobile communication terminal with a vector animation technology, the vector animation interactive service method including the steps of: a) requesting a supply of a WAP page through a wireless Internet; b) downloading a WML script constituting the WAP page; c) transferring the WML script to an embedded plug-in, and processing a portion, which includes information for an image and a dynamic image or execution information for a game in the WML script, at a variable value for conversion in the embedded plug-in; d) transferring the information processed at the variable value to a vector graphic engine; and e) displaying or executing the image, the dynamic image or the game through the vector graphic engine.

According to another aspect of the present invention, there is provided a mobile communication terminal for providing a vector animation interactive service, the mobile communication terminal including a WAP browser, an embedded plug-in and a vector graphic engine in order to connect to a wireless Internet via a mobile communication network and retrieve and receive information, wherein the mobile communication terminal downloads and analyzes a WML script constituting a WAP page of the wireless Internet, processes a portion, which indicates information for an image and a dynamic image and execution information for a game in the WML script, at a variable value for conversion through the embedded plug-in, transfers the variable value and a control authority for the portion to the vector graphic engine, and performs a display of the image and a dynamic image or an execution of the game on the WAP browser through the vector graphic engine.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
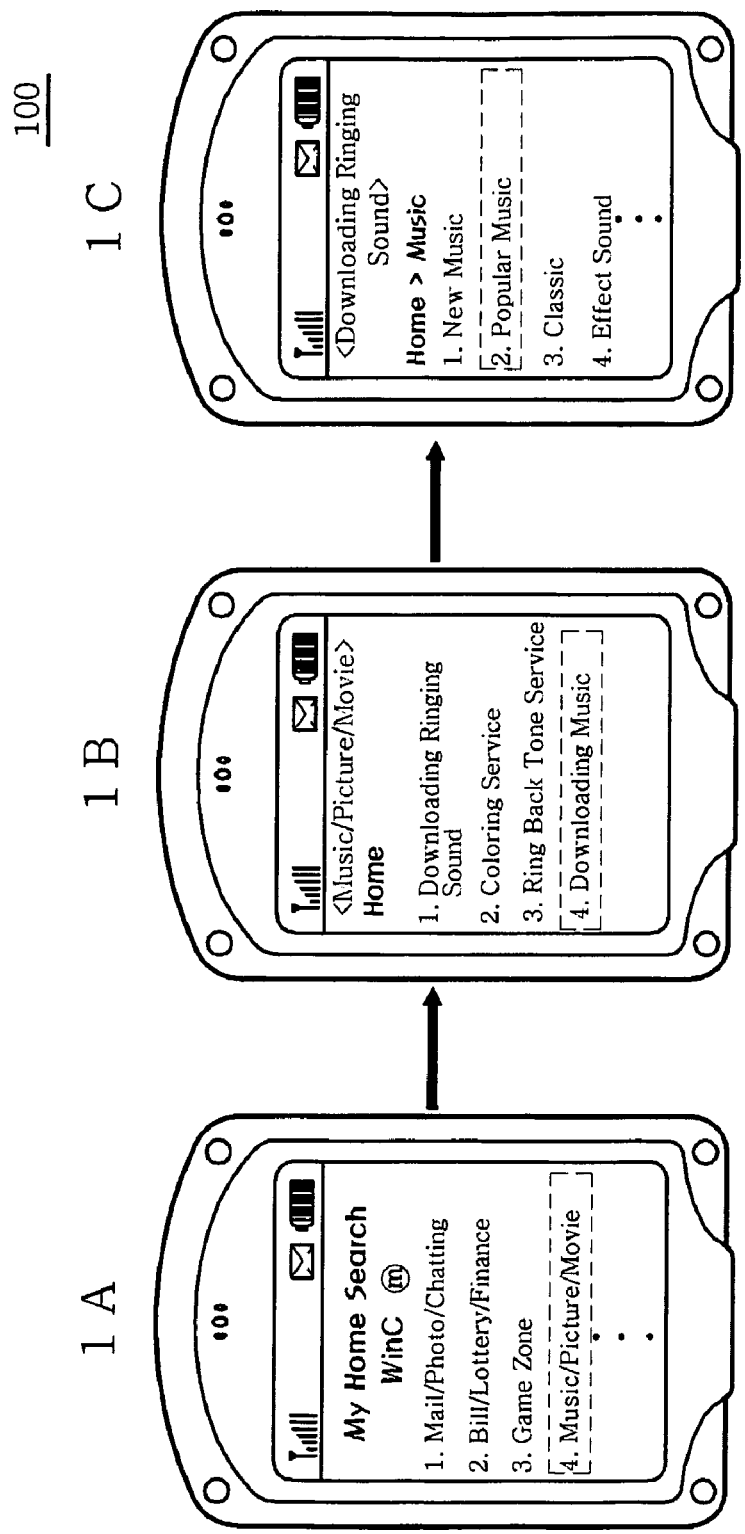
FIG. 1 is a screen of a mobile communication terminal showing the course of using a wireless Internet by means of a conventional WAP browser.

Reference will now be made in detail to the preferred embodiment of the present invention. The same reference numerals are used to designate the same elements as those shown in other drawings. In the following description of the present invention, a detailed description of known configurations and functions incorporated herein will be omitted when it may make the subject matter of the present invention rather unclear.

Figure 2:
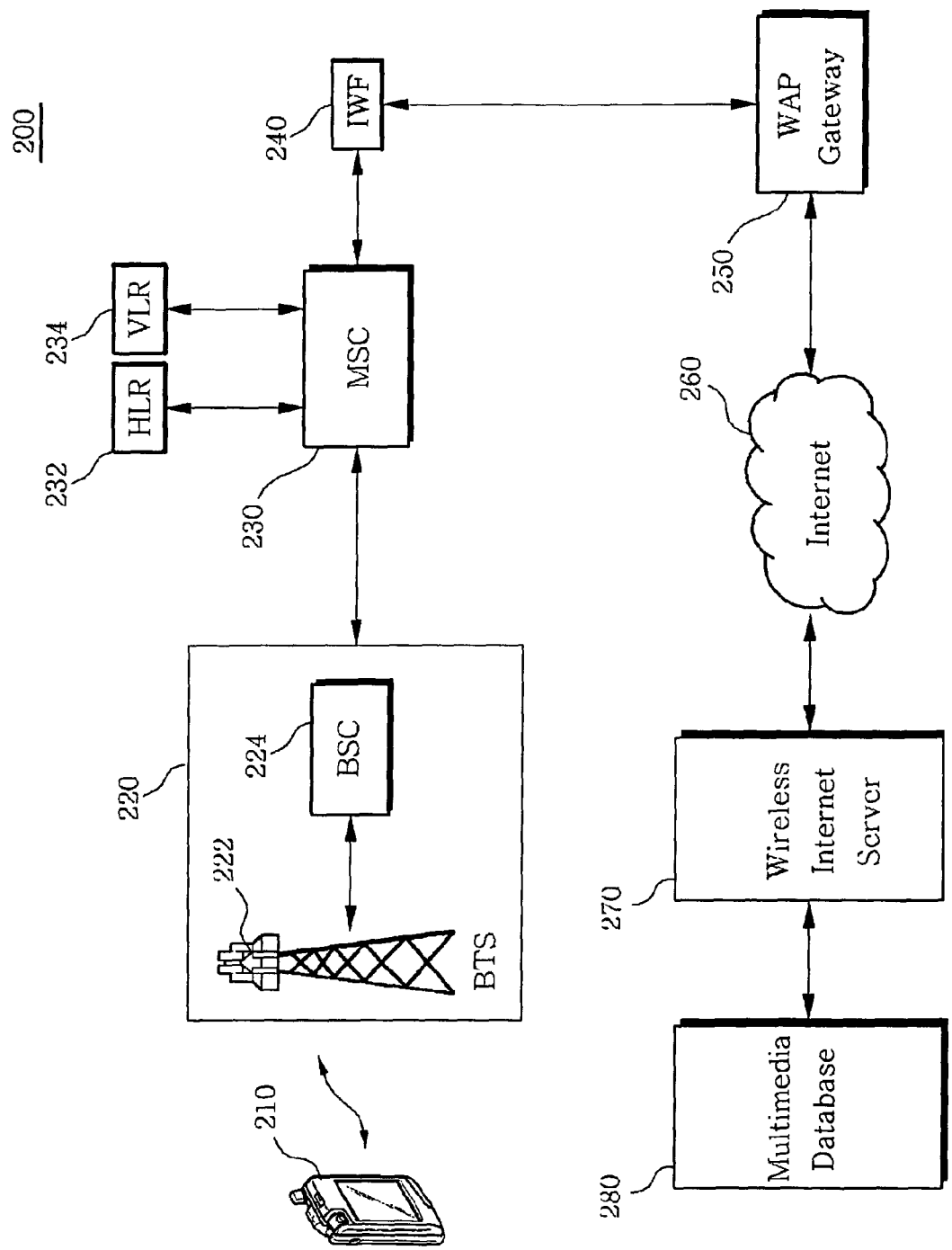
FIG. 2 is a block diagram schematically showing the construction of a wireless Internet service system using a mobile communication network.

FIG. 2 is a block diagram schematically showing the construction of a wireless Internet service system using a mobile communication network.

The wireless Internet service system includes a mobile communication terminal 210, a radio base station 220, a mobile switching center 230, a Home Location Register (HLR) 232, a Visitor Location Register (VLR) 234, an Inter-Working Function (IWF) 240, a gateway 250, an Internet 260, a wireless Internet server 270, a multimedia database 280, etc.

The mobile communication terminal 210 is a terminal capable of performing phone communication with a counterpart through wireless communication via the mobile communication network and retrieving desired information by means of an information retrieval function after connecting to the wireless Internet server 270 through the wireless Internet. The mobile communication terminal 210 includes a PDA, a cellular phone, a PCS phone, a Global System for Mobile (GSM) phone, a Wideband CDMA (W-CDMA) phone, a CDMA-2000 phone, a Mobile Broadband System (MBS) phone, etc.

Further, the mobile communication terminal 210 stores an embedded plug-in, a WAP browser, and a vector graphic engine in a memory therein in order to provide a vector animation interactive service according to the present invention. The embedded plug-in represents a plug-in for generating a new window in a WAP page without change of a screen and enabling an content image or a dynamic image to be displayed or a game to be executed in the generated window in an embedded mode.

A plug-in represents a program easily installed in a browser for use, which includes a shockwave, an acrobat, a media player, a real player, etc. Since the plug-in is automatically recognized by the browser and provides an effect of direct execution on the browser, it is well utilized for implementing multimedia.

The radio base station 220 includes a Base-station Transmission System (BTS) 222, a Base station Controller (BSC) 224, a cell enhancer, etc. The BTS 222 is installed in each cell, and transmits a communication request and a wireless Internet access request generated in the mobile communication terminal 210 to the mobile switching center 230. The BTS 222 finds out and registers a location of the mobile communication terminal 210 existing in a cell controlled by the BTS 222. In addition, the BTS 222 may acquire location information such as latitude and longitude for a location of the BTS 222 from a Global Positioning System (GPS), and transfers the location information of the BTS 222 to the mobile communication terminal 210 through a system parameter message of a forward link paging channel. The mobile communication terminal 210 calculates a movement distance thereof by using the location information of the BTS 222 controlling the cell to which the mobile communication terminal 210 belongs, so that the mobile communication terminal 210 can register new location information.

The BSC 224 controls and manages a plurality of base stations and performs all functions required for radio call processing such as handoff. Further, the BSC 224 transmits subscriber information of the location-registered mobile communication terminal 210 to the mobile switching center 230. The mobile switching center 230 performs a basic and supplementary service processing, a processing for terminating and originating calls of subscribers, a processing for a location registration procedure and a handoff procedure, an interlocking function with another network, etc. When a location registration of the mobile communication terminal 210 is performed through the radio base station 220, the mobile switching center 230 temporarily stores the subscriber information of the mobile communication terminal 210 in the VLR 234 thereof and requests the location registration of the mobile communication terminal 210 to the HLR 232.

The HLR 232 represents a database storing a service profile regarding the subscriber information of the user of the mobile communication terminal 210, which stores information for a Mobile Identification Number (MIN) and an Electronic Serial Number (ESN) of the mobile communication terminal 210, and service types in addition to a phone number of a subscriber. Further, the HLR 232 stores subscriber information including information of the radio base station 220, which controls the cell to which the mobile communication terminal 210 belongs, and the mobile switching center 230. The mobile switching center 230 includes a controller, a speech path unit and a peripheral device and also has an accounting data collection function.

The VLR 234 temporarily stores the subscriber information and transmits the subscriber information to the HLR 232 when the mobile communication terminal 210 performs the location registration. Further, the VLR 234 receives and manages a copy of an MIN, an ESN, service information, etc., and uses the copy for a location control, a call processing, an external operation processing, etc.

The IWF 240 provides an interface for data exchange between a wireless communication system and a wire communication system, and converts protocols, signals and data to be suitable for each network. Generally, the IWF 240 is directly connected to the mobile switching center 230 and connects a wire communication network with a wireless communication network.

The WAP gateway 250 performs a communication code conversion, a protocol conversion, etc., between a mobile communication network and a wire Internet network and interconnects the mobile communication network and the wire Internet network in order to quickly retrieve and display information of the wire Internet. Further, the WAP gateway 250 converts a WAP protocol and an Internet Transmission Control Protocol/Internet Protocol (TCP/IP) between them. Accordingly, data are transmitted/received between the wireless Internet server 270 connected to the Internet 260 and the WAP gateway 250 by means of a HyperText Transfer Protocol (HTTP). In addition, the data are transmitted/received between the mobile communication terminal 210 and the WAP gateway 250 by means of the WAP protocol. The WAP gateway 250 converts a website address request of the mobile communication network to a HTTP request according to the WAP protocol, and then requests a website address to the wireless Internet server 270 through the Internet 260 according to the HTTP protocol. The Internet 260 represents a communication network providing an access path so that the mobile communication terminal 210 can connect to the wireless Internet server 270 via the mobile switching center 230 and transmit/receive data.

The wireless Internet server 270 connected to the Internet 260 receives a user's information retrieval request transmitted from the mobile communication terminal 210 via the mobile communication network, and provides the mobile communication terminal 210 with information corresponding to the request via the Internet 260 and the mobile communication network. In addition, the wireless Internet server 270 can unilaterally provide information to the mobile communication terminal 210 by means of a push technique even without the retrieval request of the mobile communication terminal 210.

The multimedia database 280 stores information under the control of the wireless Internet server 270 and provides information retrieved by a user to the mobile communication terminal 210.

Figure 3:
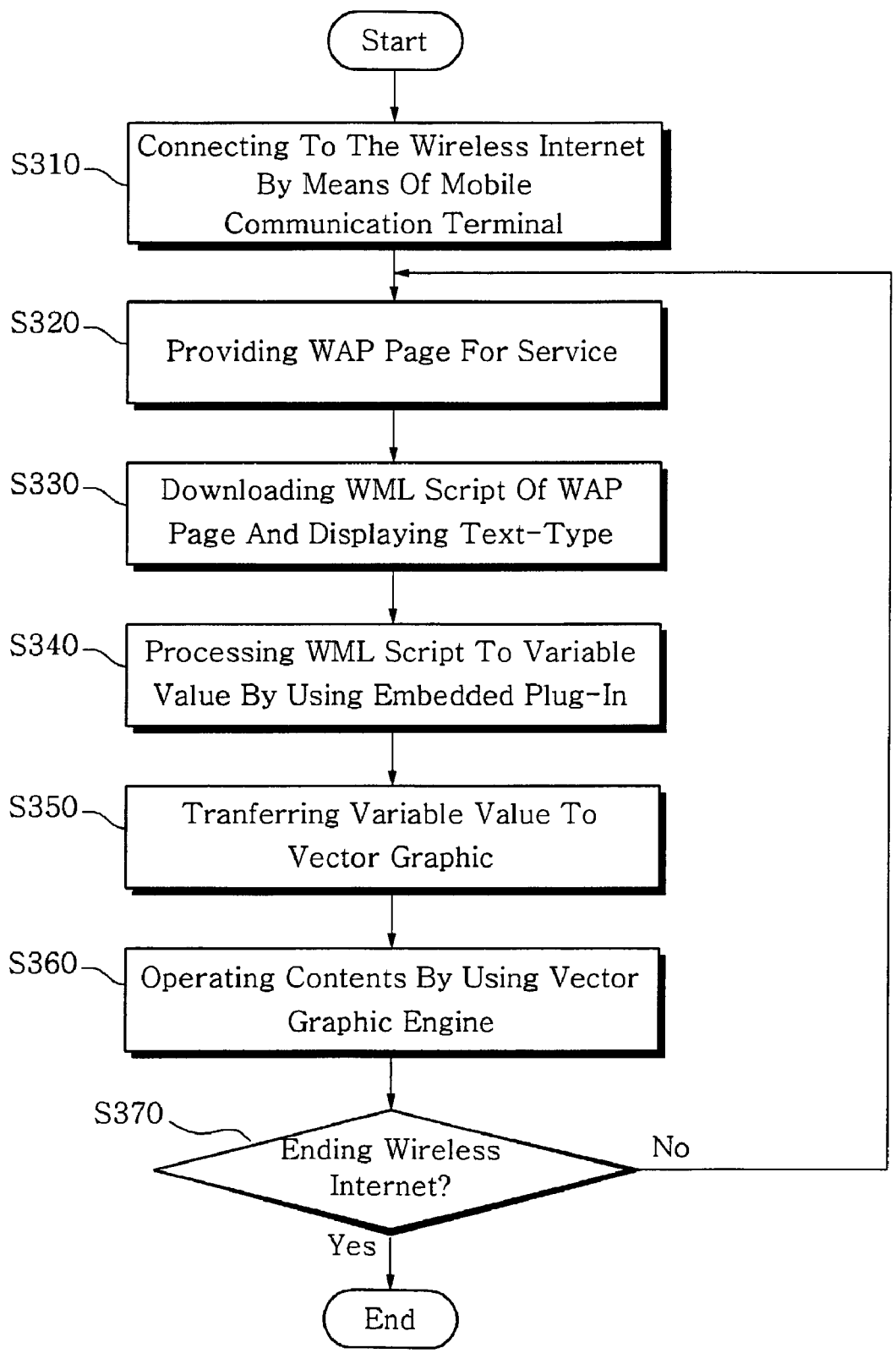
FIG. 3 is a flow diagram illustrating a contents operation process using a vector animation according to a preferred embodiment of the present invention.

FIG. 3 is a flow diagram illustrating a contents operation process using a vector animation according to a preferred embodiment of the present invention.

First, the wireless Internet server 270 provides a website so that an information provider can register information. The website provided by the wireless Internet server 270 includes a sentence for guiding an information retrieval by means of a vector animation technique according to the present invention, a registration menu used for registering information data, a retrieval menu used for an information retrieval of a user, etc. Further, the website also includes plug-in information for allowing a provided WAP page to be displayed.

According to the vector animation, which is one of techniques for implementing animation, only a sprite constructed by mathematical formulas moves without change in the background thereof. The sprite is an object independently moving in an animation. The vector animation, in which only the mathematically constructed sprite moves, has a very small file size and a very small transmission bandwidth and looks clean regardless of the file size. A 'vector graphic engine' defined in the present invention represents software capable of executing the vector animation and may be made by a language such as JAVA. Further, the vector graphic engine inter-operates with a browser through a predetermined plug-in program and receives a control authority from the browser when the vector animation is implemented.

Typically, the wireless Internet server 270 may include a server controlled by a mobile communication carrier. Further, when the wireless Internet server 270 operates separately with a mobile communication network, an operator of the wireless Internet server 270 cooperates with the mobile communication carrier, thereby allowing an information data retrieval menu to be selected from among multiple menus of the mobile communication terminal 210 having joined the mobile communication network.

That is, a user connects to the wireless Internet server 270 through the mobile communication network for information acquisition by means of an Internet access browser such as a WAP, a Microsoft Internet Explorer (MIE) based on a HTML using a HTTP protocol, a Handheld Device Transport Protocol (HDPT), an I-Mode of NTT DOCOMO, inc and a 'NATE' of SK telecom Co., Ltd (S310). When the mobile communication terminal 210 connects to the wireless Internet server 270, the multimedia database 280 provides the mobile communication terminal 210 with a plurality of information data via the mobile communication network. The data transferred to the mobile switching center 230 from the wireless Internet server 270 via the gateway 250 are converted from data proper for a WAP protocol by the gateway 250, and a WML script constituting an initial WAP page is transferred to the mobile communication terminal 210 by the WAP protocol (S320).

When the mobile communication terminal 210 connects to the wireless Internet or moves to another WAP page after connecting to the wireless Internet, the mobile communication terminal 210 downloads a text-type WML script constituting the initial WAP page or a sub-WAP page. Herein, the WML script includes a string, content image information, dynamic image information, game execution information, etc. A WML is an abbreviation for a Wireless Markup Language and represents a wireless markup language operating in a WAP.

The downloaded content image information typically has a format of <img src='picture file path'> defined in the WML script. The img src is an abbreviation for an image source and represents a tag command for paging and displaying a picture from a location in which an image is stored. Further, the content image information may be expressed in various formats in addition to the format of <img src='picture file path'>.

Further, the dynamic image information and the game execution information are displayed through text-type Uniform Resource Locator (URL) information because the WML script dose not basically support dynamic image and voice information (S330).

The mobile communication terminal 210 processes a portion, which indicates the image, dynamic image and game execution information in the WML script, at a variable value for conversion through the embedded plug-in the memory therein.

Herein, it is possible to use two methods for transferring the dynamic image information and the game execution information to the plug-in. In one method, a URL value is transferred to the plug-in, and the plug-in downloads contents and processes the contents at a variable value. In the other method, after contents are downloaded, the downloaded contents are transferred to the plug-in, and the plug-in processes the contents at a variable value (S340).

The WML script processed at the variable value is transferred to the vector graphic engine. Herein, the control authority for the portion of the WML script processed at the variable value is also transferred to the vector graphic engine. The portion of the WML script may also include layout information for display of an image, a dynamic image and a game. The layout information represents a location on a display unit of the mobile communication terminal 210 and includes an X coordinate and a Y coordinate of a start point, and a horizontal length and a vertical length of a layout (S350).

The vector graphic engine receives the variable value and operates the contents. Herein, a portion of the WML script having not been transferred to the vector graphic engine is generally displayed in a text format through a browser. However, the portion of the WML script may be displayed through the vector graphic engine.

When the methods as described above are applied to a browser in which a link variously changes, very useful effect can be obtained. That is, when it is necessary to frequently change a link menu, contents to be transferred to the vector graphic engine must be newly created in the prior art. However, according to the present invention, it is easy to change the link menu by only changing the text of the WML script in the WAP page. Herein, the vector graphic engine cooperates with the browser through the embedded plug-in, receives a control authority from the browser, and operates a content image. This is for efficiently using the memory by reducing a code size of the browser and increasing the convenience in use by reducing a loading time (S360).

When the user moves to another WAP page by means of the mobile communication terminal 210, the process after S320 for downloading the content image constituting the corresponding WAP page is repeated. If the user ends the wireless Internet because the user does not want to retrieve information any more, the browser and the vector graphic engine also stop the operation thereof (S370). In the above description, the embedded plug-in has been already installed in the mobile communication terminal 210. However, when the embedded plug-in has not been installed in the mobile communication terminal 210, it is also possible to download the embedded plug-in through WAP page, install the downloaded embedded plug-in, and reproduce contents through the installed embedded plug-in. Further, it is also possible to delete the downloaded embedded plug-in after reproducing the contents in order to ensure the memory of the mobile communication terminal 210.

Figure 4:
FIG. 4 is a screen showing a mobile communication terminal reproducing contents through a category-based menu constructed using a vector animation according to a preferred embodiment of the present invention.
Figure 4:
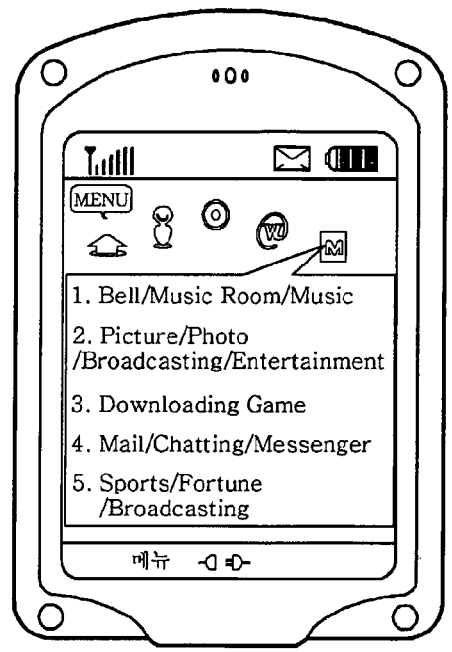
Figure 4:
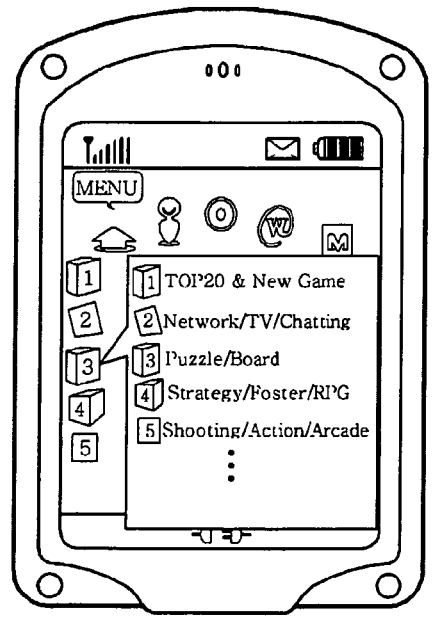
Figure 4:

FIG. 4 is a diagram showing the mobile communication terminal 210 reproducing contents through a category-based menu constructed using a vector animation according to a preferred embodiment of the present invention. When a user connects to the wireless Internet server 270 by means of the mobile communication terminal 210 for the first time, an initial WAP page is provided as shown in FIG. 4a. The initial WAP page is constructed through downloading of a text-type WML script and may also include image and dynamic information. FIG. 4a shows an uppermost menu selection portion including emoticons representing the 'My Home, retrieval, magnifier, WinC, and ⓜ' and a menu selection portion indicated by the numbers '1, 2, 3, 4 and 5', which have been constructed through the image information of the WML script.

When the user moves a cursor by using a direction button or a number button of the mobile communication terminal 210, and selects a desired menu of the menus displayed on the initial WAP page, a new window is generated on the original screen and a sub-menu is displayed. That is, when the user selects the emoticon ⓜ from among the emoticons representing the 'My Home, retrieval, magnifier, WinC, and ⓜ' shown in FIG. 4a, the mobile communication terminal 210 downloads a WML script constituting a new WAP page from the wireless Internet server 270 and displays the downloaded WML script again. Herein, the WML script includes layout information for display of the new window together with contents to be displayed on the new window.

Then, a sub-menu screen is displayed as shown in FIG. 4b. When the user selects an item '3. download game' from the displayed sub-menu, contents corresponding to the selected item are displayed on another new window as shown in FIG. 4c. Herein, when the user wants to select another menu, the user may directly select an upper menu. For example, the user may directly select the emoticon 'My Home' of the uppermost menu selection portion by means of the cursor even in FIG. 4c. When the user selects an item 'TOP 20 & New game' in FIG. 4c and then selects a 'snowboard game' through a sub-directory, a description for the 'snowboard game' is displayed as shown in FIG. 4d. The description for the 'snowboard game' includes a menu used for executing the game.

When the user selects the 'game execution' menu for executing the game, the mobile communication terminal 210 extracts the layout information from the WML script constituting the screen, generates a new window in a corresponding location, and displays the game screen through the generated window as shown in FIG. 4d. Since the game is made by the vector animation technique and displayed on the screen through the embedded plug-in, the user directly enjoy the 'snowboard game' on the browser.

In the above description, the 'snowboard game' is directly executed on the browser through the 'game execution' menu. However, it is also possible to execute a multimedia service such as a demo dynamic image viewing or an insertion music listening on the browser.

The WAP page screen as shown in FIG. 4 is only one example and can be variously modified in realizing the present invention.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

According to the present invention as described above, it is possible to provide users with various multimedia services such as interactive menus, games, advertisements and content reproduction even in a state where a browser is not closed, by interlocking a vector animation technology with a multimedia graphic-based plug-in technology in a mobile communication terminal browser. Accordingly, it is possible to promote interest of a user for use of a wireless Internet.

Further, it is possible to provide a multimedia service of high quality through an embedded plug-in in a mobile communication terminal, so that browser capacity can be minimized and a resource such as a memory of the mobile communication terminal can be saved.

The invention claimed is:
1. A vector animation interactive service method for implementing an interactive function of a vector animation by interlocking a plug-in technology used in a browser executed in a mobile communication terminal with a vector animation technology, the vector animation interactive service method comprising steps of:

a) requesting a supply of a Wireless Application Protocol (WAP) page through a wireless Internet;

b) downloading a Wireless Markup Language (WML) script constituting the WAP page;

c) transferring the WML script to an embedded plug-in, and processing and converting a portion, which includes information for an image and a dynamic image or execution information for a game, in the WML script into a variable value in the embedded plug-in, the embedded plug-in being a program arranged to generate a new window in the WAP page without change of a screen and to enable the image, the dynamic or the game to be displayed in the WAP page in an embedded manner;

d) transferring the variable value to a vector graphic engine; and e) displaying or executing the image, the dynamic image or the game through the vector graphic engine.

2. The vector animation interactive service method as claimed in claim 1, wherein step b) comprises of downloading at least one of a string, the information for the image and the dynamic image and the execution information for the game, which constitute the WAP page, through the WML script.

3. The vector animation interactive service method as claimed in claim 2, wherein the information for the dynamic image and the execution information for the game indicate locations of the information for the dynamic image and the execution information for the game through a text-type URL information.

4. The vector animation interactive service method as claimed in claim 1, wherein, in step c), when location information of the information for the image and the dynamic image or the execution information for the game is transferred from the browser to the embedded plug-in, the embedded plug-in downloads the information for the image and the dynamic image or the execution information for the game according to the location information, and processes the downloaded information at the variable value.

5. The vector animation interactive service method as claimed in claim 1, wherein, in step c), when the browser downloads the information for the image and the dynamic image or the execution information for the game and transfers the downloaded information to the embedded plug-in together with the WML script, the embedded plug-in processes the received information at the variable value.

6. The vector animation interactive service method as claimed in claim 1, wherein step d) comprises of transferring a control authority for the portion including information for the image and the dynamic image or the execution information for the game to the vector graphic engine together with variable value.

7. The vector animation interactive service method as claimed in claim 1, wherein step d) comprises of additionally transferring layout information for a display of the image or the dynamic image or an execution of the game to the vector graphic engine.

8. The vector animation interactive service method as claimed in claim 7, wherein the layout information includes an X coordinate and a Y coordinate of a start point, and a horizontal length and a vertical length of a layout.

9. The vector animation interactive service method as claimed in claim 1, wherein the vector animation, in which only a sprite constructed by mathematical formulas moves without change in a background, has a very small size of a transmitted file and a very small transmission bandwidth.

10. A mobile communication terminal for providing a vector animation interactive service, the mobile communication terminal comprising:

a Wireless Application Protocol (WAP) browser configured to couple to a wireless Internet via a mobile communication network and retrieve and receive information;

an embedded plug-in coupled to the WAP browser and configured to generate a new window in the WAP page without change of a screen and to enable an image, a dynamic image or a game to be displayed in the WAP browser in an embedded manner; and a vector graphic engine coupled to the WAP browser wherein the mobile communication terminal is configured to download and analyze a Wireless Markup Language (WML) script constituting a WAP page of the wireless Internet, to process and convert a portion, which indicates information for the image and the dynamic image or execution information for a game, in the WML script into a variable value through the embedded plug-in, to transfer the variable value and a control authority for the portion to the vector graphic engine, and to perform a display of the image and the dynamic image or the execution of the game on the WAP browser through the vector graphic engine.

11. The mobile communication terminal as claimed in claim 10, wherein the embedded plug-in provides an effect of direct execution on the WAP browser, so that the embedded plug-in is well utilized for implementing multimedia.

12. The mobile communication terminal as claimed in claim 10, wherein the information for the dynamic image and the execution information for the game indicate locations of the information for the dynamic image and the execution information for the game through a text-type URL information.

13. The mobile communication terminal as claimed in claim 12, wherein, when the URL information is transferred to the embedded plug-in, the embedded plug-in downloads the information for the image and the dynamic image or the execution information for the game according to the URL information, and processes the downloaded information at the variable value.

14. The mobile communication terminal as claimed in claim 12, wherein, after the WAP browser downloads the information for the image and the dynamic image or the execution information for the game according to the URL information and transfers the downloaded information to the embedded plug-in, the embedded plug-in processes the received information at the variable value.

* * * * *